(12) United States Patent
Vaughey et al.

(10) Patent No.: US 8,795,905 B2
(45) Date of Patent: Aug. 5, 2014

(54) ELECTROLYTES FOR LITHIUM ION BATTERIES

(75) Inventors: John Vaughey, Elmhurst, IL (US); Andrew N. Jansen, Bolingbrook, IL (US); Dennis W. Dees, Downers Grove, IL (US)

(73) Assignee: Uchicago Argonne, LLC, Chicago, IL (US)

( * ) Notice: Subject to any disclaimer, the term of this patent is extended or adjusted under 35 U.S.C. 154(b) by 334 days.

(21) Appl. No.: 12/495,489

(22) Filed: Jun. 30, 2009

(65) Prior Publication Data

US 2010/0040955 A1 Feb. 18, 2010

Related U.S. Application Data

(60) Provisional application No. 61/079,727, filed on Jul. 10, 2008.

(51) Int. Cl.
*H01M 6/16* (2006.01)

(52) U.S. Cl.
USPC ........... 429/341; 429/322; 429/323; 429/339; 429/231.1; 429/231.3; 429/231.5

(58) Field of Classification Search
USPC ........... 429/341, 322, 323, 339, 231.1, 231.3, 429/231.5
See application file for complete search history.

(56) References Cited

U.S. PATENT DOCUMENTS

| | | | | |
|---|---|---|---|---|
| 7,465,517 | B2 * | 12/2008 | Ivanov et al. | 429/200 |
| 7,592,540 | B2 * | 9/2009 | Park et al. | 429/300 |
| 2005/0227143 | A1 | 10/2005 | Amine et al. | |
| 2006/0216612 | A1 | 9/2006 | Jambunathan et al. | |

* cited by examiner

*Primary Examiner* — Laura Weiner
(74) *Attorney, Agent, or Firm* — Foley & Lardner LLP (57) ABSTRACT

A family of electrolytes for use in a lithium ion battery. The genus of electrolytes includes ketone-based solvents, such as, 2,4-dimethyl-3-pentanone; 3,3-dimethyl 2-butanone(pinacolone) and 2-butanone. These solvents can be used in combination with non-Lewis Acid salts, such as $Li_2[B_{12}F_{12}]$ and LiBOB.

10 Claims, 8 Drawing Sheets

FIG. 5B  0 C (Failed at −30 C)

ELECTROLYTES FOR LITHIUM ION BATTERIES

The United States Government has certain rights in this invention pursuant to Contract No. DE-AC02-06CH11357 between the U.S. Department of Energy and University of Chicago Argonne, LLC representing Argonne National Laboratory.

CROSS-REFERENCE TO RELATED PATENT APPLICATIONS

This application claims the benefit under 35 USC 119(e) of U.S. Provisional Application No. 61/079,727, filed Jul. 10, 2008 and is incorporated herein by reference in its entirety.

FIELD OF THE INVENTION

The present invention relates generally to the field of lithium ion batteries. More particularly, the invention relates to electrolytes for lithium ion batteries, such as for example, ketone-based solvents.

BACKGROUND OF THE INVENTION

There is currently enormous pressure to develop alternative power sources for vehicles (and other systems needing a portable energy source) to reduce US national dependence on petroleum products as an energy source. The US government and industry has identified hybrid electric vehicles (HEV) and plug-in hybrid electric vehicles (PHEV) as one method to reduce the US national dependence on petroleum products. For example, a key issue for HEV and, in particular, PHEV is the development of batteries which operate at lower temperatures since a large fraction of vehicles and power sources in the US must be able to function at temperatures in the range of 0° C. and less. Tests have shown that the battery chemistry presently used cannot meet requirements below 0° C., a relatively common winter temperature for the northern half of the U.S. The cause of this problem is not known at this time. For example, recently for HEV's and low mileage PHEV's, the DOE, USCAR, and several manufacturers have identified lithium titanate as a possible anode for these systems for safety and power reasons. However, as with other systems, it has the same low temperature issues.

In typical lithium ion battery systems, the electrolyte is a mixture of organic solvents containing a lithium salt, e.g. 1M LiPF$_6$. For many battery systems the limiting factor in overall performance is the ability of the electrolyte to conduct lithium ions and have stability over the appropriate electrochemical window. Evidence suggests that a limiting factor in improving battery power and improving low temperature performance is the carbonate-based electrolytes presently used, which are optimized for room temperature operation, while low temperatures typically require special additives. In the next generation of hybrid electric vehicle (HEV), battery cost and power are key issues, in addition to the ability to function at a variety of temperatures, including low temperatures.

SUMMARY OF THE INVENTION

In one aspect of the invention, a new class of lithium ion battery electrolytes has been identified. These electrolytes are generally based on a ketone-based solvent which has substantial advantages over presently used electrolytes., such as lower cost, improved power performance and the ability to operate at low temperatures. Typical solvents that have been identified include 2,4-dimethyl-3-pentanone, 3,3-dimethyl-2-butanone(pinacolone), and 2-butanone. These solvents have heretofore been ignored due in part to the higher reactivity of ketones with the electrolyte salt, caused by the Lewis Acid component of the lithium salt coordinating and destabilizing the ketone moiety, resulting in a variety of decomposition and other side-reactions. Recent advances in electrolyte salt development have identified several new non-Lewis Acid salts, e.g. Li$_2$[B$_{12}$F$_{12}$] and LiBOB, that are stable in ketone-based solvents. New electrolytes that are promising candidates against the preferred lithium titanate electrode have been established. Additional studies of physical mixtures of the ketone solvents with some SEI (Solid Electrolyte Interphase) forming additives found improvements in stability and performance. In certain instances, the addition of an SEI forming additive allowed the materials to cycle well against a graphite anode.

These and other objects, advantages, and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF PREFERRED EMBODIMENT

Figure 1:
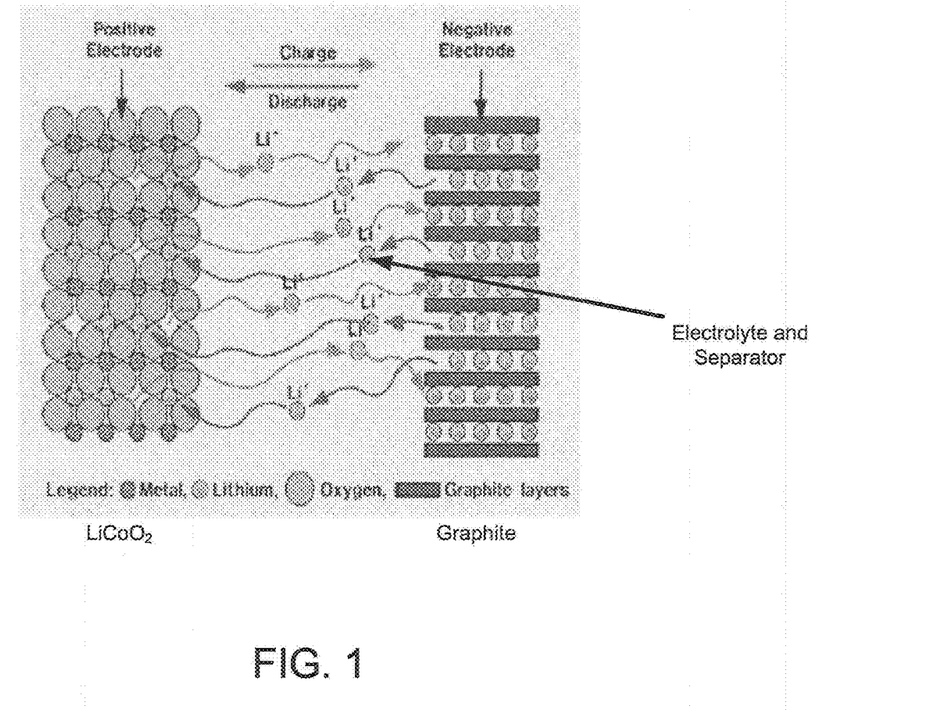
FIG. 1 is a typical Li ion battery system.
Figure 2:
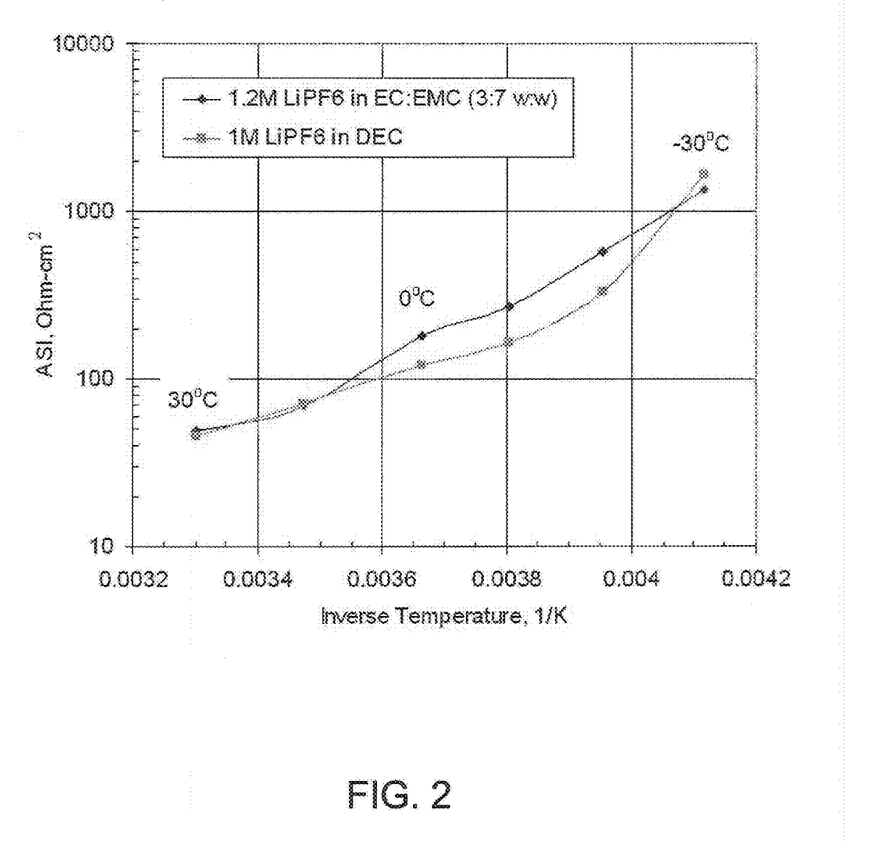
FIG. 2 shows low temperature performance for selected conventional systems.

A typical lithium ion battery system is shown at 10 in FIG. 1. Conventional systems employ an electrolyte such as 1M LiPF$_6$ in a mixture of organic carbonates, such as propylene carbonate (PC), dimethyl carbonate (DMC), diethyl carbonate (DEC), ethyl methyl carbonate (EMC), and ethylene carbonate (EC). Low temperature performance is illustrated in FIG. 2 for conventional systems (1.2M LiPF$_6$ in EC:EMC—3:7 w:w—and 1M LiPF$_6$ in DEC). A number of carefully considered experiments have enabled concluding that the electrodes, separator, solvent conductivity, viscosity and SEI changes are not the cause of the resistance increase shown in FIG. 2.

The interaction of the salt and solvent have been evaluated as a function of temperature, including changes in coordination number as temperature drops and changes in coordination environment (types of ligands). Alternative solvents to the deficient carbonates should have high polarity, an adequate electrochemical operating window and have stability to the chosen electrodes. Using LiPF$_6$ salt, a series of bulky ketones show excellent stability and good low temperature performance. However, many ketones do not operate well on addition of LiPF$_6$ salt:

PF$_5$+R'C(O)R→R'+[RCO] (acyllium ion) R not always equal to R' (R or R' can be but not limited to methyl, ethyl, propyl, phenyl, butyl, tertiary butyl)
and Lewis Acid attack on the carbonyl carbon of the ketone results in a rapid decomposition of the electrolyte. Elimination of this problem is achieved by removing the Lewis Acid component of the salt. This allows use of selected ketones as electrolytes.

Figure 3A:
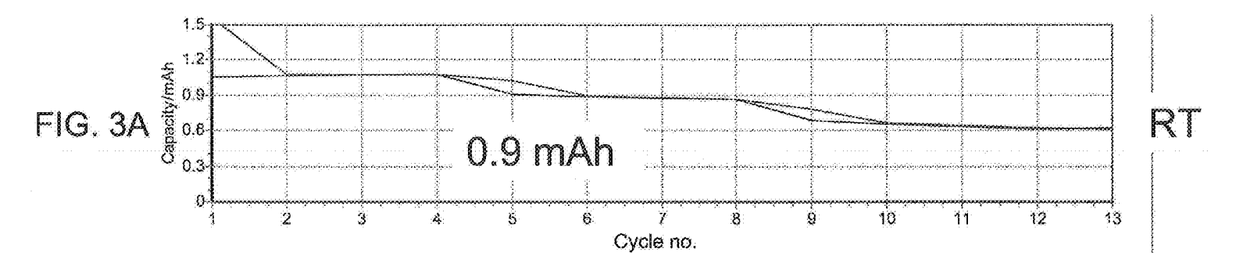
FIG. 3A shows performance of the baseline system at room temperature.
Figure 3B:
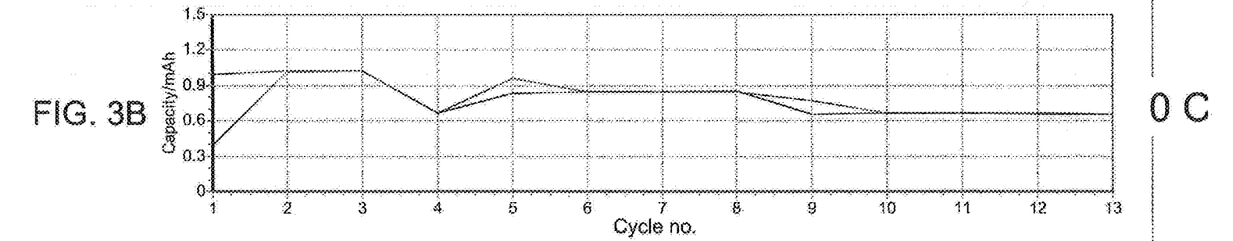
FIG. 3B shows performance at 0° C.
Figure 3C:
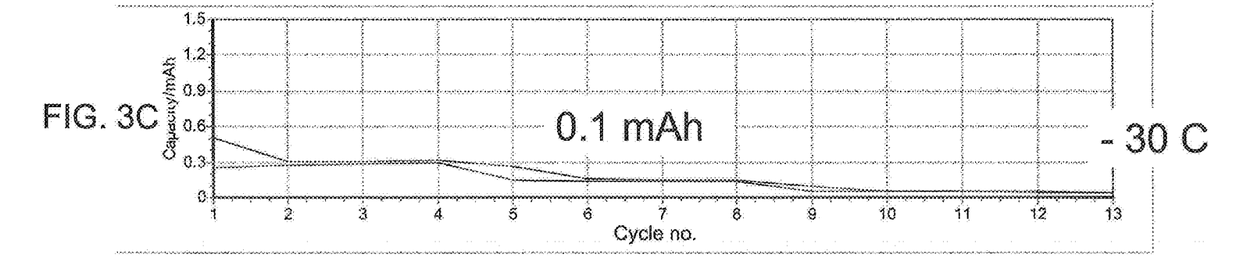
FIG. 3C shows performance at minus 30° C.

A baseline cell was constructed in the manner of FIG. 1, and baseline performance (capacity as a function of current) are shown at three different operating temperatures in FIGS. 3A-3C. The electrode system used was Li(Mn Co Ni)O$_2$ versus Li$_4$Ti$_{15}$O$_{12}$. The Li$_4$Ti$_{15}$O$_{12}$ is a well known and promising candidate for HEV battery systems. The baseline cell performed at 1.5-2.7V. In addition to these electrodes above, graphite anodes were evaluated; but due to a substantially lower negative potential, several solvent candidates had limited stability. In addition, the addition of EC did help in SEI formation.

Figure 4A:
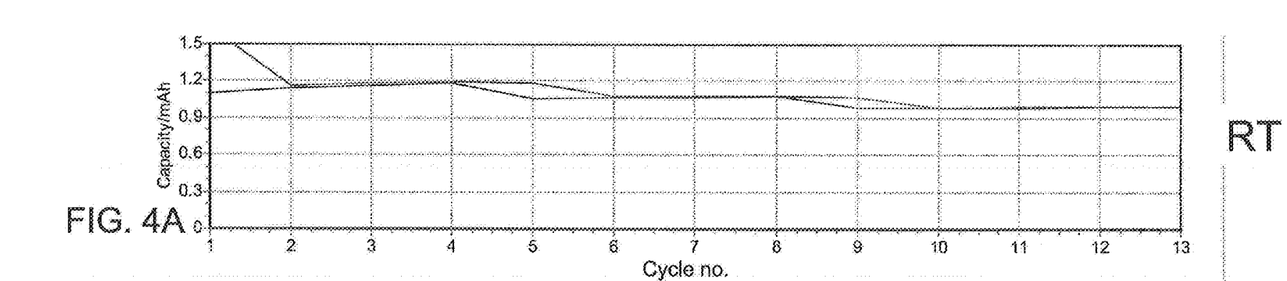
FIG. 4A shows cycling performance of 1M LiPF$_6$ in 2,4 dimethyl 3 pentanone at room temperature.
Figure 4B:
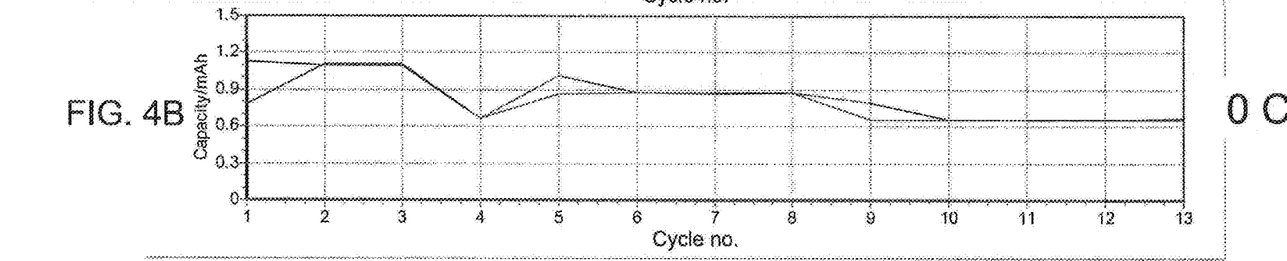
FIG. 4B shows performance at 0° C.
Figure 4C:
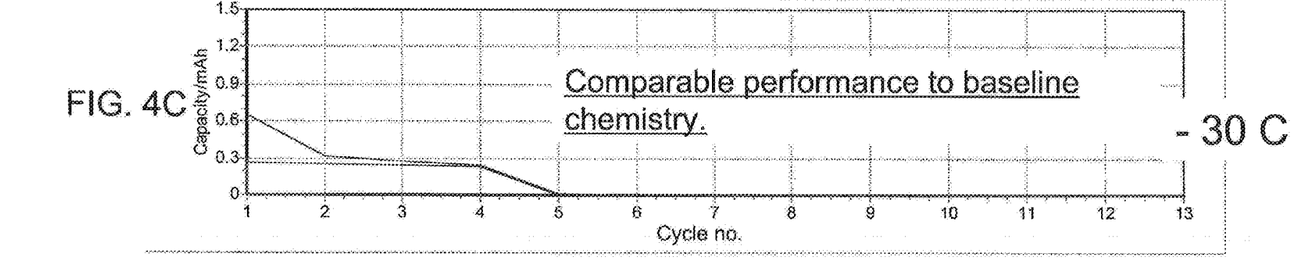
FIG. 4C shows performance at minus 30° C.

One of the concepts applied to solve the electrolyte problem was to reduce attack by PF$_5$ at the carbonyl carbon site by blocking access using bulky R-groups. Some preferred candidates included 2,4 dimethyl 3 pentanone and 3,3 dimethyl 2 butanone. FIGS. 4A-4C show performance of 2,4 dimethyl 3 pentanone. These electrolytes substantially improved stability to LiPF$_6$ (about 2-3 months), and the addition of a Lewis acid scavenger assisted in increased stability. Such scavengers can include HMPA and DMAc. Dimethyl Actamide (DMAc) is used as an additive to electrolytes. It is known to reversibly bind to Lewis acid sites to stabilize the solutions to decomposition. HMPA—hexa methyl phosphoramide also is a Lewis acid binder and performs the same function.

Figures 5A, 5B:
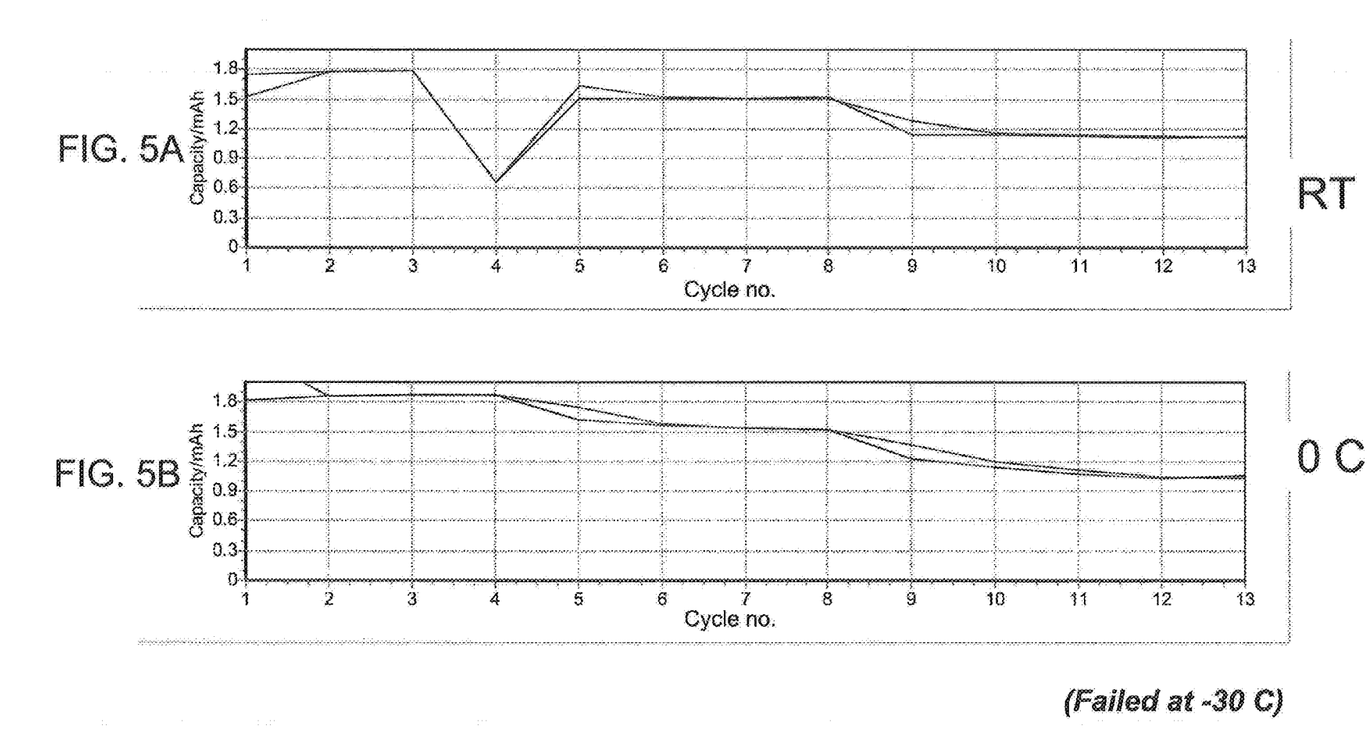
FIG. 5A shows cycling performance of 1M LiBOB in 3,3 dimethyl 2 butanone at room temperature
FIG. 5B shows performance at 0° C.
Figure 6A:
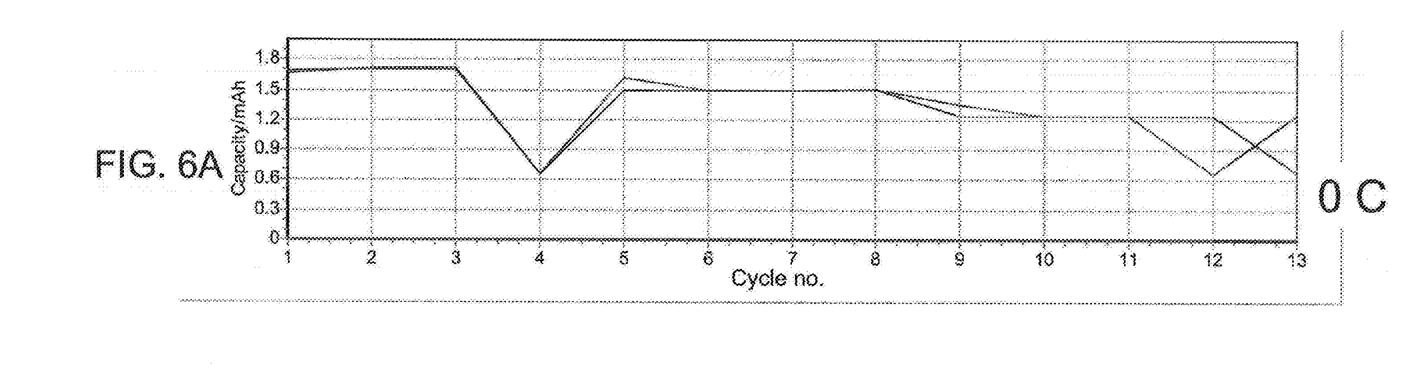
FIG. 6A shows cycling performance of 0.5M Li$_2$[B$_{12}$F$_{12}$] in 2 butanone at 0° C.
Figure 6B:
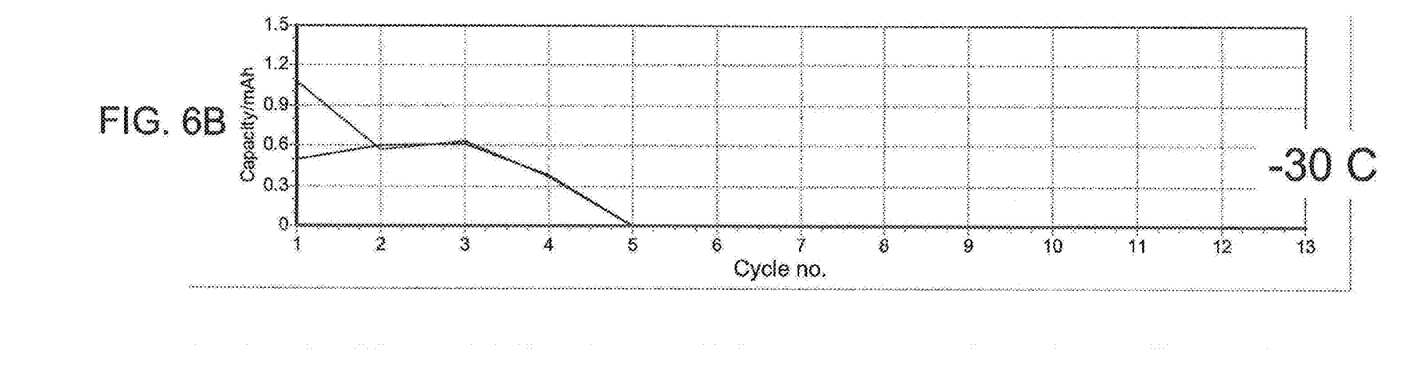
FIG. 6B shows performance at minus 30° C.
Figure 7A:
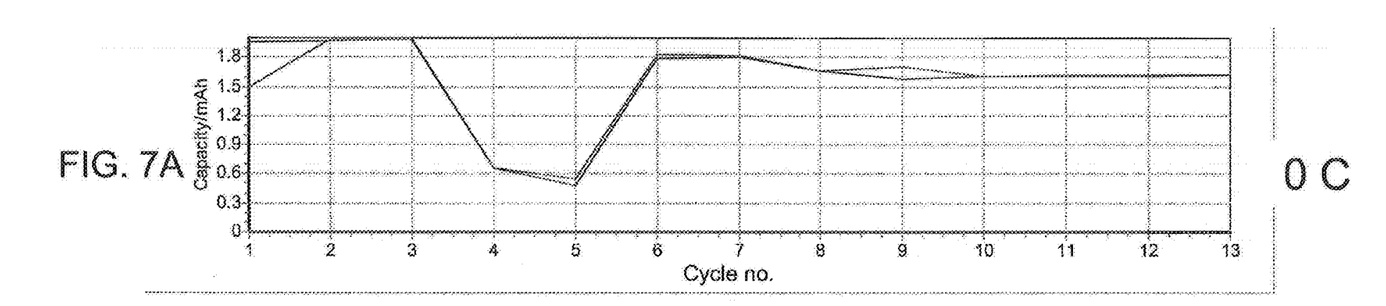
FIG. 7A shows cycling performance of 0.8 M LiBOB in 2 butanone at 0° C.
Figure 7B:
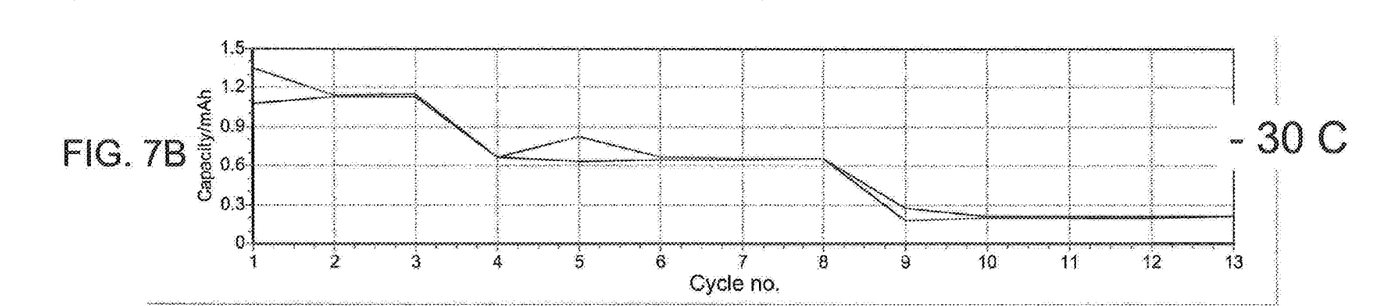
FIG. 7B shows performance at minus 30° C.

Non-Lewis acid salts were also operated with bulky R-groups and simpler ketones, such as, but not limited to 3,3 dimethyl 2 butanone and 2-butanone, respectively, since Lewis acid attack on the solvent was identified as a primary cause of electrolyte failure in these systems. In FIGS. 5A-5B are shown operating performance for 1 M LiBOB in 3,3 dimethyl 2 butanone. In FIGS. 6A and 6B are shown operating performance for 0.5M Li$_2$[B$_{12}$F$_{12}$] in 2-butanone. In FIGS. 7A-7B are shown operating performance for 0.8M LiBOB in 2-butanone.

Characterization of these systems was performed by use of NMR and solubility evaluation. A study of VT Li NMR showed very stable solvent coordination environment around the Li atom as a function of temperature for the bulky ketones. Mixed solvent systems tended to change coordination environment as a function of temperature, and the coordination number of Li increased as temperature dropped.

The solubility of LiPF$_6$ was determined in various ketone solvents and was found soluble up to 2.3M. LiBOB was soluble up to 1.2M, Li$_{12}$[B$_{12}$F$_{12}$] was soluble up to 0.8M and cell performance capacity peaked below the maximum solubility.

The following example is illustrative of certain aspects of the invention and is not meant to limit the scope thereof.

Example

Figure 8:
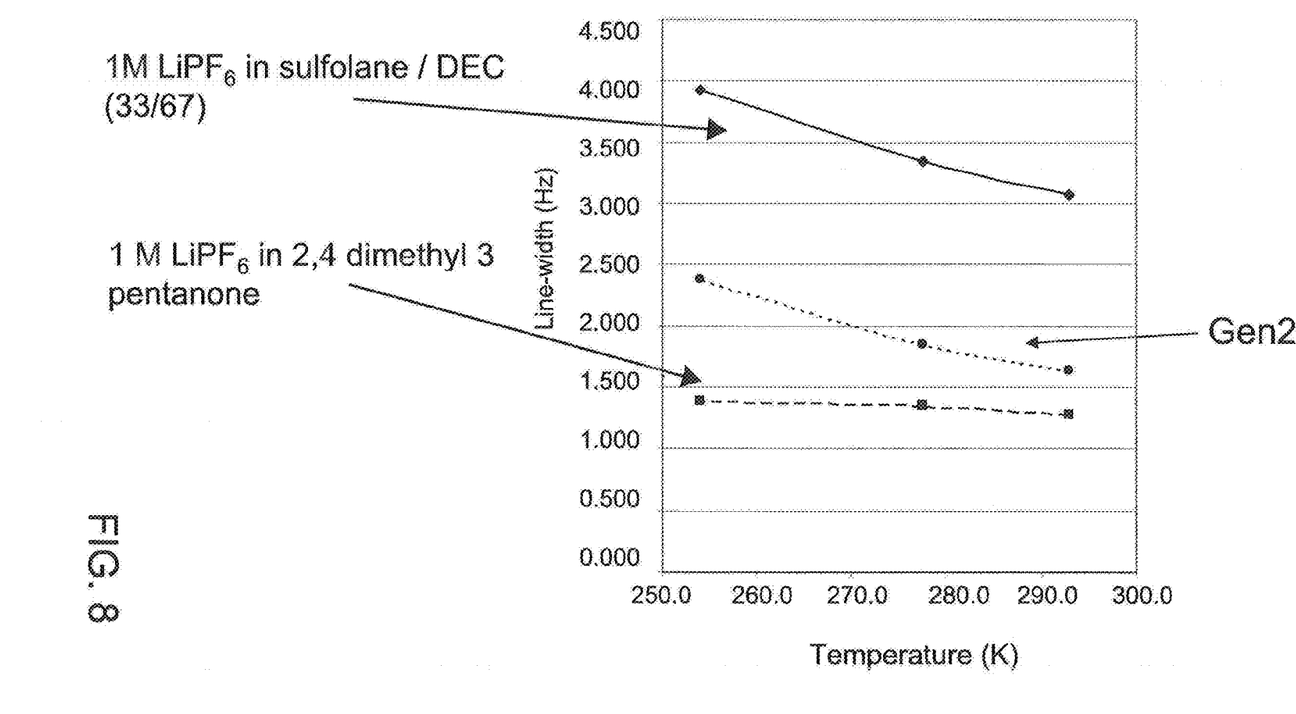
FIG. 8 illustrates VT$^7$Li NMR study results.

An experiment was performed to understand the behavior of Li as a function of temperature. A set of VT$^7$Li NMR studies were performed on electrolytes. The Li line widths were determined as a function of temperature wherein line widths correspond to the degree of stability of the solvent sphere around the Li and to some extent its 'weight.' FIG. 8 illustrates the results.

The foregoing description of embodiments of the present invention have been presented for purposes of illustration and description. It is not intended to be exhaustive or to limit the present invention to the precise form described, and modifications and variations are possible in light of the above teachings and may be reasonably obtained in practice of the invention. The embodiments were chosen and described in order to explain the fundamental principles of the invention and its applications to enable one of skill in the art to utilize these techniques in various embodiments in their available combinations for the fairly based uses contemplated.

What is claimed is:

1. An electrolyte for a lithium ion battery, the electrolyte comprising:
    a ketone-based solvent selected from the group consisting of: 2,4-dimethyl-3-pentanone, 3,3-dimethyl-2-butanone and 2-butanone; and
    Li(bis oxalato borate) or Li$_2$(B$_{12}$F$_{12}$).

2. The electrolyte of claim 1, wherein the ketone-based solvent is 2-butanone.

3. The electrolyte of claim 1, wherein the ketone-based solvent is 2,4-dimethyl-3-pentanone.

4. The electrolyte of claim 1 further comprising hexamethylphosphoramide or dimethylacetamide.

5. The electrolyte of claim 1, wherein the ketone-based solvent is 3,3-dimethyl-2-butanone.

6. A lithium ion battery, comprising:
    an electrode system comprising:
        a cathode comprising Li(MnCoNi)O$_7$; and
        an anode comprising Li$_4$Ti$_5$O$_{12}$; and
    an electrolyte;
    wherein the electrolyte comprises:
        a ketone-based solvent selected from the group consisting of 2,4-dimethyl-3-pentanone, 3,3-dimethyl-2-butanone and 2-butanone; and
        Li(bis oxalato borate) or Li$_2$(B$_{12}$F$_{12}$).

7. The lithium ion battery of claim 6 further comprising hexamethylphosphoramide or dimethylacetamide.

8. The lithium ion battery of claim 6, wherein the ketone-based solvent is 2-butanone.

9. The lithium ion battery acid of claim 6, wherein the ketone-based solvent is 3,3-dimethyl-2-butanone.

10. The lithium ion battery acid of claim 6, wherein the ketone-based solvent is 2,4-dimethyl-3-pentanone.

* * * * *